United States Patent
Brothers et al.

(10) Patent No.: US 7,831,635 B2
(45) Date of Patent: Nov. 9, 2010

(54) COLLECTING INFORMATION AT A REMOTE SITE

(75) Inventors: William Brothers, Rocklin, CA (US); Philip A. Flocken, Denver, CO (US); Noreen K. Lee, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 363 days.

(21) Appl. No.: 11/212,960

(22) Filed: Aug. 26, 2005

(65) Prior Publication Data

US 2007/0074153 A1 Mar. 29, 2007

(51) Int. Cl.
G06F 7/00 (2006.01)
G06F 9/44 (2006.01)
G06F 15/173 (2006.01)

(52) U.S. Cl. .................. 707/803; 707/602; 709/223; 709/224; 717/106

(58) Field of Classification Search .................. 707/102
See application file for complete search history.

(56) References Cited

U.S. PATENT DOCUMENTS

| | | | |
|---|---|---|---|
| 6,697,967 B1 | 2/2004 | Robertson | |
| 6,999,990 B1* | 2/2006 | Sullivan et al. | 709/205 |
| 7,117,113 B1* | 10/2006 | Baekelmans et al. | 702/123 |
| 7,325,137 B2* | 1/2008 | Masui et al. | 713/176 |
| 2003/0126236 A1* | 7/2003 | Marl et al. | 709/220 |
| 2003/0200149 A1* | 10/2003 | Gonzalez et al. | 705/26 |
| 2004/0123188 A1* | 6/2004 | Srinivasan et al. | 714/44 |
| 2004/0243575 A1 | 12/2004 | Ohashi | |
| 2005/0144265 A1* | 6/2005 | Roe-Smith et al. | 709/223 |
| 2006/0004767 A1* | 1/2006 | Diaconu et al. | 707/10 |
| 2006/0156086 A1* | 7/2006 | Flynn et al. | 714/712 |

FOREIGN PATENT DOCUMENTS

| | | |
|---|---|---|
| EP | 1143356 B1 | 10/2001 |
| FR | 2826477 A | 12/2002 |

OTHER PUBLICATIONS

"Get ahead with Sun software, Stay ahead with sun software standard support", Sun Microsystems, copyright 2002.*
"Fargo: Technical Description" by M. Fredrikson, et al. Dept. of Comp. Science & Bus. Admin., Univ. College of Karlskrona/Ronneby, Sweden. Total pp. 11.

* cited by examiner

*Primary Examiner*—Etienne P LeRoux
*Assistant Examiner*—Cindy Nguyen

(57) ABSTRACT

Embodiments of the invention relate to techniques for collecting information. In an embodiment, a support engineer for a vendor, when desiring information to be collected at a customer site, creates an XML (Extensible Markup Language) file that includes collection instructions. The support engineer then sends the XML file to the customer who, upon receiving the XML file, posts the XML file to a collection system. The collection system having the XML file as an input invokes the collection software that executes the collection instructions included in the XML file, and generates the information desired by the support engineer. The collection system, via a pre-setup transport mechanism, then transfers the collected information to a system accessible to the support engineer on the vendor's site.

11 Claims, 2 Drawing Sheets

COLLECTING INFORMATION AT A REMOTE SITE

BACKGROUND OF THE INVENTION

A support engineer supporting vendor applications often needs information from a customer to solve the customer's problem. Currently, when that happens, the support engineer contacts the customer by phone, fax, email, etc., indicating the necessary information and detailing the steps and data that must be retrieved. The customer, on the other side, must perform the prescribed steps correctly and send the data to the vendor/support engineer, which requires that the customer setup access and notify the support engineer when all steps have been accomplished. The whole process of interaction between the support engineer and the customer results in various problems, including, for example, 1) contacting the correct individual at the customer site is often difficult and time consuming 2) the customer doesn't always follow the instructions carefully which results in incorrect or incomplete data 3) the instructions may be unclear, incomplete, or incorrect which results in incomplete and/or incorrect data 4) the chain of events between the support engineer and the customer takes time, e.g., several days up to a week, which can result in stale data 5) setting up a communication link between the customer and the vendor often requires paper work and time 6) the customer must remember to notify the support engineer when the work has been completed or the process stalls.

In various situations, the customer site includes electronic systems to provide the information to the support engineer. However, these approaches are static because the process requires the system to have existing list of items to collect for the support engineer. If items not in the list are to be collected, then it takes a long time, e.g., up to months, to update the system for collection capabilities of such new items, including shipping the new set of collection package to the customer, installing the package into the customer's system, etc.

SUMMARY OF THE INVENTION

Embodiments of the invention relate to techniques for collecting information from a remote site. In an embodiment, a support engineer for a vendor, when seeking to have information collected at a customer site, creates an XML (Extensible Markup Language) file that includes collection instructions. The support engineer then sends the XML file to the customer who, upon receiving the XML file, posts the XML file to a collection system with collection software. The collection system having the XML file as input invokes the collection software, which, together with the collection system, executes the collection instructions included in the XML file, and generates the information desired by the support engineer. The collection system, via a transport software and mechanism, then transfers the collected information to a system accessible to the support engineer on the vendor's site. Generally, information at the customer' site is collected and provided to the support engineer with minimum involvement by the customer.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
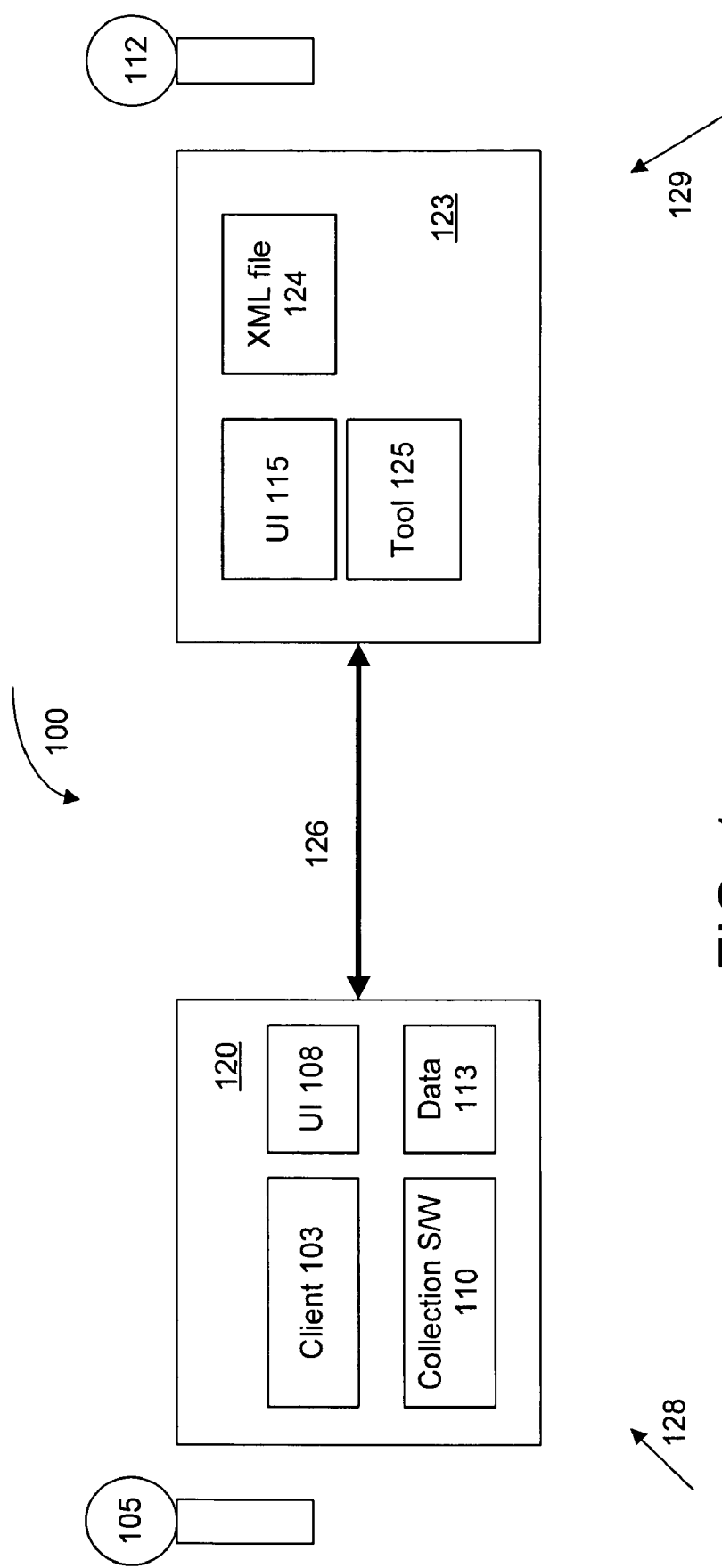
FIG. 1 shows an arrangement upon which embodiments of the invention may be implemented.

FIG. 1 shows an arrangement 100 upon which embodiments of the invention may be implemented. Arrangement 100 includes a customer site 128 associated with customer 105 and a vendor site 129 associated with a vendor/support engineer 112. Customer site 128 includes a customer system 120, which runs client 103 and collection software 110. Vendor site 129 includes vendor system 123, which runs user interface 115 and tool 125.

Client 103 is a software package running on customer 105's computer 120. In an embodiment, client 103 is a self-healing package of Hewlett-Packard Company of Palo Alto, Calif., which provides diagnostic data-collection and services to customers.

Collection software 110 includes various software packages or modules, e.g., 110(1), 110(2), . . . , 110(N) (not shown), each of which provides a corresponding set of data. For example, module 110(1) provides data associated with the database, module 110(2) provides data associated with the operating system, module 110(3) provides data associated with a vendor application, etc. Collection software 110 supports a list of instructions that when these instructions are recognized, collection software 110 executes them accordingly. For example, collection software 110 upon having XML file 124 as input recognizes those instructions included in the XML file 124 that it supports and executes them. Examples of instructions supported by collection software 110 include collecting part of a file, the whole file, executing a command and capturing the outputs, processing some information, checking a condition, and if true, then execute instructions following the condition, etc. The list of instructions is provided here as an example only, other instructions are within the scope of embodiments of the invention as long as those instructions are supported by collection software 110. That is, those instructions can be recognized and executed by collection software 110. Collection software 110 validates the signature of XML file 124 before executing the instructions in the file.

Support engineer 112 uses tool 125 to generate XML file 124 including collection instructions and electronically sends this XML file 124 and the instructions to customer 105, e.g., via email and the like. In an embodiment, support engineer 112 uses an application program to generate the collection instructions.

User interface 115 enables support engineer 112 to invoke tool 125 to generate XML file 124 and/or to view/access to collection information or data 113 received from client system 120.

File 124 includes instructions for collection software 110 to execute and thus collect data as desired by support engineer 112. In the embodiment of FIG. 1, file 124 is in the XML format, and, for illustration purposes, may be referred to as XML file 124. However, the invention is not limited to this XML format. Various other formats are within the scope of embodiments of the invention as long as file 124 can be recognized by system 120 and instructions in file 124 are supported and thus executable by collection software 110. For example, file 124 may be encoded and therefore be decoded by collection system 120, and, once file 124 is decoded, then collection instructions in file 124 may be executed by collection software 110. XML file 124 is "signed" to allow customer 105 to verify its authenticity. Upon recognizing an instruction in XML file 124 as one of the instructions that collection software 110 supports, collection software 110 automatically executes such instruction accordingly.

Tool 125 provides a mechanism for support engineer 112 to specify information desired to be collected and to generate XML file 124 that includes instructions for collection software 110 to collect the desired information. Tool 125, having support engineer 112's input including information to be acquired, generates the instructions and XML file 124.

In an embodiment, transport channel 126 is preset up so that information from system 120 may be transported via transport channel 126 to vendor system 123 in a trusted, secured, and transparent manner. Generally, a transport software package is responsible for transporting information between client system 120 and vendor system 123.

Providing Instructions to Collect Desired Information

In various embodiments, when support engineer 112 seeks to have information collected from customer' site, support engineer 112 creates XML file 124 that includes instructions to collect the desired information. Depending on situations, the information may be desired as supplemental information associated with an existing problem or incident of customer 105. There are various ways to create XML file 124, and the invention is not limited to a particular way to create this file. However, in an embodiment, support engineer 112 uses tool 125 to create this XML file 124. Support engineer 112 then emails XML file 124 to customer 105. Upon receiving XML file 124, customer 105 uses a web browser having a URL pointing to client 103 to post XML file 124 to client 103. Customer 105, via a field in the web page, specifies the name and location of XML file 124, then clicks a "post" or "submit" button which, using an HTTP (Hyper Text Transfer Protocol), transports XML file 124 from its location to client 103 on system 120. Client 103, upon receiving XML file 124 automatically invokes collection software 110 to execute instructions included in XML file 124 and thus generate information/data 113 desired by support engineer 112. In effect, customer 105 is required to do minimum work and yet information desired by support engineer 112 is collected at customer 105' site and sent to vendor system 123 accessible to support engineer 112 as appropriate. If collection information 113 is associated with an existing problem or incident, then information related to this existing incident such as the incident identification number, the incident name, etc., is also included in XML file 124. Client 103, before sending collection information 113 to system 123, associates this collection information 113 to such existing incident. An incident refers to a problem of customer 105. Generally, when a problem is detected on system 120, client software 103 invokes collection software 110 to gather data that will help support engineer 112 diagnose the problem. The submission of data to the vendor/support engineer 112 for a detected problem is called an incident, and each incident is given a unique identifier by client software 103. When requesting additional data for an existing incident, support engineer 112 includes the incident identifier for an existing problem in XML file 124. When client software 103 gathers the additional data defined in XML file 124, client software 103 includes the incident identifier. When the data is sent to vendor system 123, it will be associated with the existing incident based on the incident identifier. This allows user interface 115 to display gathered data for a particular incident whether it was received from the initial data submission or from a data submission in accordance with instructions included in XML file 124.

Example Illustrating a Method Embodiment

Figure 2:
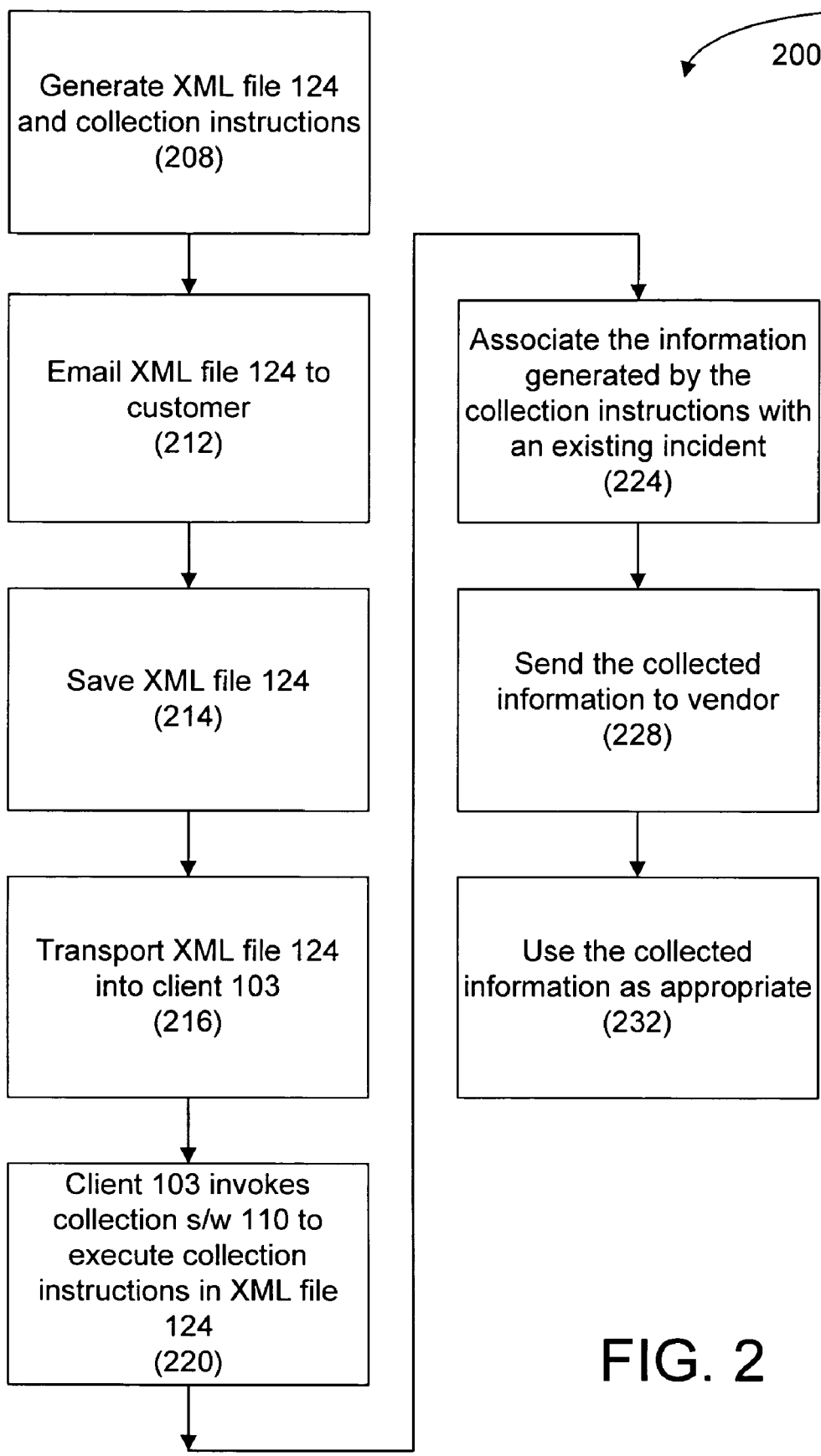
FIG. 2 shows a flowchart illustrating a method embodiment of the invention.

FIG. 2 shows a flowchart 200 illustrating a method embodiment of the invention. In this example, an existing problem/incident has been logged and data related to this incident is accessible to support engineer 112 via interface 115. Support engineer 112, having analyzed the available data, determines that additional data is desirable to solve the problem related to the logged incident. For this example, support engineer 112 determines that support engineer 112 desires collection software 110 to run a command that generates outputs desired by support engineer 112.

In block 208, support engineer 112 brings up a web page having information related to the exemplary incident, and, via this web page, invokes tool 125 to generate XML file 124 and collection instructions.

In block 212, support engineer 112 emails a message to customer 105, including XML file 124.

In block 214, customer 105 saves XML file 124 in a convenient storage, e.g. a local disc drive.

In block 216, customer 105 uses user interface 108 to transport XML file 124 into client 103.

In block 220, client 103 invokes collection software 110 for it to execute the command included in XML file 124 and thus acquire information desired by support engineer 112.

In block 224, client 103, based on information in XML file 124, recognizes that the additional desired information is related to an existing incident and therefore associates this information with the existing incident.

In block 228, client 103 then sends the collected information to support engineer 112 via pre-setup transport channel 126 and vendor system 123. Since the collected information is associated with an existing incident, the collected information is linked to other information associated with such incident.

In block 232, support engineer 112 invokes interface 115 to access the collected information and uses this information to solve the related problem as appropriate.

Advantages

Embodiments of the invention provide the ability for support engineer 112 to dynamically acquire information/data from customer 105. Embodiments are dynamic because support engineer 112 determines information desirable to solve customer 105's problem and can specify how such information may be collected by creating instructions included in XML file 124. Support engineer 112 may add and/or change the collection instructions as desired. In such situations, support engineer just creates new instructions in a new XML file and sends the new XML file to customer 105. At the customer's site, customer 105 posts XML file 124 to collection system 120 for it to generate the desired information without having to do the scavenger hunt, e.g., search for the information, determine what kind of data is needed, where and how to get the data, etc. Customer 105 does not have to actually interpret the instructions or technical steps, which removes instruction/human errors from the collection process. The collection process is thus automated from customer 105's viewpoint after customer 105 posts XML file 124 to collection system 120. The whole collection process does not require changes in collection software 110 nor heavy involvement by customer 105.

In the above illustration, embodiments of the invention are described in the context of a vendor and customer relationship. However, the invention is not limited to such a relationship, but is also applicable in other situations. For example, within different sites of a vendor, information between team members may be exchanged. That is, a first member at a first site may request information from a second member at a second, e.g., remote, site by generating XML file 124 and sending it to the second team member for this second team member to collect the desire information. Similarly, HTTP protocol is used in an embodiment to post XML file 124, various other network protocols may be used without departing from the scope of the invention, including, for example, Java RMI (Remote Method Invocation), CORBA (Common Object Request Broker Architecture), DCOM (Distributed Component Object Model), DCE (Distributed Computing Environment), etc.

Computer

A computer may be used in embodiments of the invention, such as being implemented as system 120 that runs client 103, collection software 110, etc., to perform embodiments in accordance with the techniques described in this document, etc. For example, a CPU (Central Processing Unit) of the computer executes program instructions implementing the method embodiments by loading the program from a CD-ROM (Compact Disc-Read Only Memory) to RAM (Random Access Memory) and executes those instructions from RAM. The program may be software, firmware, or a combination of software and firmware. In alternative embodiments, hard-wire circuitry may be used in place of or in combination with program instructions to implement the described techniques. Consequently, embodiments of the invention are not limited to any one or a combination of software, firmware, hardware, or circuitry.

Instructions executed by the computer may be stored in and/or carried through one or more computer readable-media from which a computer reads information. Computer-readable media may be magnetic medium such as, a floppy disk, a hard disk, a zip-drive cartridge, etc.; optical medium such as a CD-ROM, a CD-RAM, etc.; memory chips, such as RAM, ROM, EPROM (Erasable Programmable ROM), EEPROM (Electrically Erasable Programmable ROM), etc. Computer-readable media may also be coaxial cables, copper wire, fiber optics, capacitive or inductive coupling, etc.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for collecting information at a customer site, comprising:

determining, at a support engineer site, to have particular information collected;

creating an XML file at the support engineer site that includes a collection instruction that, when being executed, permits the particular information to be collected at the customer site;

sending, from the support engineer site to the customer site, the collection instruction to a recipient associated with the customer site;

transporting the collection instruction to a collection system having a collection software at the customer site;

the collection software having the XML file as input, upon recognizing that it supports the collection instruction, invokes the collection software which together with the collection system executes the collection instruction included in the XML file so that the collection software collects the particular information at the customer site as determined at the support engineer site and identified by the collection instruction; and sending the particular information, prior to analysis of the particular information, from the customer site to the support engineer site for analysis.

2. The method of claim 1 wherein transporting uses a web page and a network protocol and is via a client software.

3. The method of claim 1 wherein the information is desired by a vendor and for use in solving a problem of a customer of the vendor; the customer being associated with the customer site; the vendor being associated with the support engineer site.

4. The method of claim 3 wherein the particular information is supplemental to other information associated with an existing incident at the customer site.

5. A system comprising:

a storage medium;

a client software that is stored in the storage medium;

a collection software supporting a list of vendor instructions; and an XML file that includes an instruction in the list of vendor instructions;

wherein upon the XML file being posted to the client software;

the client software automatically invokes the collection software, having the XML file as input, to execute the instruction so that the collection software collects desired vendor information, wherein the collection software executes the instruction if the instruction is in the list of vendor instructions, wherein the XML file that includes the instruction is created so that when it is executed it provides desired vendor information without customer involvement, and wherein the XML file is created at a support engineer site and is posted at a customer site;

wherein the collection software collects desired vendor information identified by the instruction; and wherein the client software transmits the desired vendor information, prior to analysis of the information, to the support engineer site, being remote from the customer site, for analysis at the support engineer site.

6. The system of claim 5 wherein the XML file is posted to the client software via at least one of an HTTP, a Java RMI, a CORBA, A DCOM, a DCE.

7. The system of claim 5 wherein the support engineer site is associated with a vendor and the customer site is associated with a customer of the vendor.

8. The system of claim 5 wherein the XML file is created at the support engineer first site to be posted at the customer site thereby allowing the desired vendor information to be generated at the customer site.

9. A non-transitory computer-readable storage medium including computer readable instructions stored thereon which are executed by a processor to cause a device to perform a method to:
- receive an XML file, including a vendor instruction, created at a support engineer site to collect particular information at a customer site without involvement of a customer associated with the customer site; and
- permit a computer system, associated with the customer site, to collect information based on the vendor instruction in XML file wherein:
- the XML file and the instruction are created in a computer system at a support engineer first site;
- the XML file is posted to a client software in a computer system at a customer site via a network protocol; and
- the client software, having the XML file as input, automatically invokes a collection software to execute the vendor instruction in the computer system at the customer site when the XML file is posted to the client software so that the collection software collects the particular information at the customer site;
- wherein the collection software collects the particular information identified by the vendor instruction in the XML file; and
- the client software transmits the particular information, prior to analysis of the particular information, from the customer site to the support engineer site for analysis.

10. The medium of claim 9 wherein the network protocol is an HTTP, a Java RMI, a CORBA, a DCOM, a DCE.

11. The medium of claim 9 wherein the XML, file is encoded at the support engineer site and is decoded at the customer site.

* * * * *

UNITED STATES PATENT AND TRADEMARK OFFICE
CERTIFICATE OF CORRECTION

| | | |
|---|---|---|
| PATENT NO. | : 7,831,635 B2 | |
| APPLICATION NO. | : 11/212960 | |
| DATED | : November 9, 2010 | |
| INVENTOR(S) | : William Brothers et al. | |

It is certified that error appears in the above-identified patent and that said Letters Patent is hereby corrected as shown below:

In column 6, line 60, in Claim 6, delete "A DCOM" and insert -- a DCOM --, therefor.

In column 6, line 65, in Claim 8, delete "first site" and insert -- site --, therefor.

In column 8, line 13, in Claim 11, delete "XML," and insert -- XML --, therefor.

Signed and Sealed this
Fifth Day of April, 2011

David J. Kappos
*Director of the United States Patent and Trademark Office*